US012583977B2

(12) United States Patent (10) Patent No.: US 12,583,977 B2
Higuchi et al. (45) Date of Patent: Mar. 24, 2026

(54) BLOCK POLYMER, THERMOPLASTIC RESIN COMPOSITION AND MOLDED ARTICLE

(71) Applicant: SANYO CHEMICAL INDUSTRIES, LTD., Kyoto (JP)

(72) Inventors: Shintaro Higuchi, Kyoto (JP); Satoru Teranishi, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 464 days.

(21) Appl. No.: 18/032,269

(22) PCT Filed: Oct. 13, 2021

(86) PCT No.: PCT/JP2021/037948
§ 371 (c)(1),
(2) Date: Apr. 17, 2023

(87) PCT Pub. No.: WO2022/085542
PCT Pub. Date: Apr. 28, 2022

(65) Prior Publication Data
US 2023/0391962 A1 Dec. 7, 2023

(30) Foreign Application Priority Data

| Oct. 20, 2020 | (JP) | 2020-175706 |
| Dec. 24, 2020 | (JP) | 2020-214410 |
| Mar. 4, 2021 | (JP) | 2021-034282 |

(51) Int. Cl.

| C08L 23/06 | (2006.01) |
| C08F 10/06 | (2006.01) |
| C08G 81/02 | (2006.01) |
| C08L 23/12 | (2006.01) |
| C08L 53/00 | (2006.01) |

(52) U.S. Cl.
CPC ............ C08G 81/021 (2013.01); C08F 10/06 (2013.01); C08L 23/06 (2013.01); C08L 23/12 (2013.01); C08L 53/00 (2013.01)

(58) Field of Classification Search
CPC .. C08F 297/083; C08F 297/08; C08F 297/00; C08F 255/02; C08F 220/0325; C08F 220/04; C08F 222/06; C08G 81/021; C08L 53/00; C08L 23/12
See application file for complete search history.

(56) References Cited

U.S. PATENT DOCUMENTS

| 6,635,715 | B1 | 10/2003 | Datta et al. | |
| 2003/0195308 | A1* | 10/2003 | Waymouth | C08F 10/00 |
| | | | | 526/348 |
| 2009/0136774 | A1 | 5/2009 | Onogi et al. | |
| 2010/0285246 | A1 | 11/2010 | Becker et al. | |

| 2012/0245293 | A1* | 9/2012 | Crowther | C08F 299/00 |
| | | | | 525/195 |
| 2012/0245298 | A1* | 9/2012 | Hagadorn | C08F 290/062 |
| | | | | 525/299 |
| 2015/0225517 | A1 | 8/2015 | Ohtani et al. | |
| 2018/0312675 | A1 | 11/2018 | Inoue | |
| 2018/0371176 | A1 | 12/2018 | Duchateau et al. | |
| 2021/0032410 | A1 | 2/2021 | Hasegawa et al. | |

FOREIGN PATENT DOCUMENTS

| CN | 1671756 | 9/2005 |
| CN | 101374902 | 2/2009 |
| CN | 101410449 | 4/2009 |
| EP | 0 832 924 | 4/1998 |
| EP | 0 934 975 | 8/1999 |
| EP | 1 002 814 | 5/2000 |
| JP | 10-87906 | 4/1998 |
| JP | 2010-24398 | 2/2010 |
| JP | 2013-209460 | 10/2013 |
| JP | 2015-117362 | 6/2015 |
| JP | 2015-193806 | 11/2015 |
| JP | 2016-121342 | 7/2016 |
| JP | 2018-517823 | 7/2018 |
| JP | 2019-517608 | 6/2019 |
| JP | 2019-151824 | 9/2019 |
| JP | 2019-163449 | 9/2019 |
| JP | 2020-19934 | 2/2020 |
| JP | 2020-164819 | 10/2020 |
| WO | 01/46278 | 6/2001 |
| WO | 2004/014972 | 2/2004 |
| WO | 2009/092752 | 7/2009 |
| WO | 2014/038574 | 3/2014 |
| WO | 2016/205387 | 12/2016 |
| WO | 2017-210064 | 12/2017 |
| WO | 2019/146591 | 8/2019 |
| WO | 2020/196007 | 10/2020 |

* cited by examiner

OTHER PUBLICATIONS

International Search Report issued Dec. 14, 2021 in International (PCT) Application No. PCT/JP2021/037948.

*Primary Examiner* — Mark S Kaucher

(74) *Attorney, Agent, or Firm* — Wenderoth, Lind & Ponack, L.L.P.

(57) ABSTRACT

Provided is a block polymer (X) containing, as structural units, a polyolefin structure derived from a polyolefin (A) below and a polyolefin structure derived from a polyolefin (B) below. The polyolefin (A) contains a C3-C8 α-olefin as a structural monomer with α-olefin portions having an isotacticity of 70 to 100%, has a number average molecular weight of 1000 to 200000, and has a carbon-carbon double bond number of 0.01 to 8.0 per 1000 carbon atoms. The polyolefin (B) contains a C3-C8 α-olefin as a structural monomer with α-olefin portions having an isotacticity of 1 to 65%, and has a number average molecular weight of 1000 to 200000.

7 Claims, No Drawings

BLOCK POLYMER, THERMOPLASTIC RESIN COMPOSITION AND MOLDED ARTICLE

TECHNICAL FIELD

The present invention relates to block polymers, thermoplastic resin compositions, and molded articles.

BACKGROUND ART

Polyolefin resins have excellent properties such as moldability, rigidity, and electric insulation and are inexpensive. They are therefore widely used for many purposes in the form of molded articles of a variety of shapes, such as a film and a fiber. Various modifiers for polyolefin resins have been developed and, in order to improve the pigment dispersibility or mechanical strength, modifiers containing a low molecular weight polyolefin have been proposed (For example, see Patent Literature 1).

CITATION LIST

Patent Literature

Patent Literature 1: JP 2015-117362 A

SUMMARY OF INVENTION

Technical Problem

The above techniques have insufficient mechanical strength. The present invention aims to provide a block polymer that gives excellent mechanical strength to thermoplastic resins, particularly polyolefin resins.

Solution to Problem

The present inventors studied for any solution to the above problem and arrived at the present invention. Specifically, the present invention relates to a block polymer (X) containing, as structural units, a polyolefin structure derived from a polyolefin (A) below and a polyolefin structure derived from a polyolefin (B) below; a thermoplastic resin composition (Z) containing the block polymer (X) and a thermoplastic resin (Y); and a molded article of the thermoplastic resin composition (Z).

The polyolefin (A) contains a C3-C8 α-olefin as a structural monomer with α-olefin portions having an isotacticity of 70 to 100%, has a number average molecular weight of 1000 to 200000, and has a carbon-carbon double bond number of 0.01 to 8.0 per 1000 carbon atoms.

The polyolefin (B) contains a C3-C8 α-olefin as a structural monomer with α-olefin portions having an isotacticity of 1 to 65%, and has a number average molecular weight of 1000 to 200000.

Advantageous Effects of Invention

The block polymer (X) of the present invention exerts the following effects:
(1) giving an excellent modifying effect (improvement of the mechanical strength such as tensile strength, flexural strength, and impact strength) to a molded article of the thermoplastic resin composition (Z); and (2) giving excellent mechanical strength to a recycled polyolefin resin (YR).

DESCRIPTION OF EMBODIMENTS

<Polyolefin (A)>

The polyolefin (A) is a polyolefin that contains a C3-C8 α-olefin as a structural monomer with the α-olefin portions having an isotacticity of 70 to 100%, that has a number average molecular weight of 1000 to 200000, and that has a carbon-carbon double bond number of 0.01 to 8.0 per 1000 carbon atoms.

Hereinbelow, the term "C3-C8 α-olefin" is also referred to as "α-olefin".

Examples of the α-olefin include propylene, 1-butene, 1-pentene, 1-hexene, 1-heptene, and 1-octene.

In terms of the isotacticity to be described later, the α-olefin is preferably propylene.

The polyolefin (A) and the polyolefin (B) to be described later can be distinguished by the isotacticity of the α-olefin portions.

The polyolefin (A) may contain a different monomer as a structural monomer in addition to the α-olefin. In this case, the weight of the different monomer is preferably 20 wt % or less, more preferably 15 wt % or less, still more preferably 10 wt % or less based on the weight of all monomers defining the polyolefin (A).

Examples of the different monomer defining the polyolefin (A) include ethylene, 2-butene, isobutene, α-olefins having a carbon number of (hereinafter, also abbreviated to C) 9 to 30 such as 1-decene and 1-dodecene, and C4-C30 unsaturated monomers other than the α-olefins, such as vinyl acetate.

The different monomer is preferably ethylene. Also, the polyolefin (A) is preferably a propylene/ethylene copolymer.

In terms of the modifying effect of the block polymer (X) to be described later, the isotacticity of the α-olefin portions in the polyolefin (A) is 70 to 100%, preferably 75 to 100%, more preferably 80 to 100%.

The isotacticity of the α-olefin portions in the polyolefin (A) tends to be directly reflected in the isotacticity of the α-olefin portions in an acid-modified polyolefin (AE), a hydroxy group-modified polyolefin (AG), an aminocarboxylic acid-modified polyolefin (AJ), an epoxy group-modified polyolefin (AQ), or an isocyanate group-modified polyolefin (AM), each of which is a combination of the polyolefin (A) with a binder (γ) to be described later.

The isotacticity can be calculated using $^{13}$C-NMR (nuclear magnetic resonance). According to common knowledge, the side-chain methyl groups in the case where the α-olefin is propylene and the side-chain methylene groups adjacent to the respective main-chain methine groups in the case where the α-olefin is 1-butene, 1-pentene, 1-hexene, 1-heptene, or 1-octene are influenced by the stereochemistry (meso- or raceme-structure) of both sides (triad), both sides of the triad (pentad), or about both sides of the pentad (heptad) so that peaks are observed at different chemical shifts. Thus, the tacticity is commonly evaluated for the pentads. The isotacticity in the block polymer (X) of the present invention is also calculated based on the evaluation for the pentads.

In other words, in the case where the α-olefin is propylene, the isotacticity is calculated by the following formula (1):

$$\text{Isotacticity}(\%)=[(Ha)/\Sigma(H)]\times100 \qquad (1)$$

wherein, with respect to the carbon peaks derived from the side-chain methyl groups in the propylene units obtained by $^{13}$C-NMR, (H) represents the peak intensity of each pentad of the α-olefin portions; and (Ha) represents the peak intensity derived from the methyl groups in the isotactic polyolefin in which every pentad has the meso-structure.

In the case where the α-olefin is 1-butene, 1-pentene, 1-hexene, 1-heptene, or 1-octene, the isotacticity is calculated by the above formula (1) wherein, with respect to the carbon peaks derived from the side-chain methylene groups adjacent to the respective main-chain methine groups in the α-olefins obtained by $^{13}$C-NMR, (H) represents the peak intensity of each pentad of the α-olefin portions; and (Ha) represents the peak intensity derived from the side-chain methylene groups adjacent to the respective main-chain methine groups in the isotactic polyolefin in which every pentad has the meso-structure.

The isotacticity of the α-olefin portions can be adjusted by changing the polymerization conditions in polymerizing the α-olefin portions.

The difference between the isotacticity of the α-olefin portions in the polyolefin (A) and the isotacticity of the α-olefin portions in the polyolefin (B) is preferably 10 to 90%, more preferably 20 to 80%, still more preferably 30 to 70%.

The measurement conditions for isotacticity herein are as follows.

Device: ECZ400R, available from JEOL Ltd.
Measurement mode: proton decoupling
Pulse width: 8 μsec
Pulse repetition time: 4.6 sec
Relaxation time: 3.0 sec
Number of scans: 10000
Solvent: ortho-dichlorobenzene
Reference: tetramethylsilane
Sample concentration: 10 mg/mL
Measurement temperature: 120° C.

In terms of the modifying effect of the block polymer (X), the number average molecular weight (Mn) of the polyolefin (A) is preferably 1000 to 200000, more preferably 1500 to 100000, particularly preferably 2000 to 50000.

Herein, the number average molecular weight (Mn) can be measured by gel permeation chromatography (GPC).

The measurement conditions for Mn by GPC herein are as follows.

Device: high temperature gel permeation chromatograph "Alliance GPCV 2000", available from Waters
Detector: refractive index detector
Solvent: ortho-dichlorobenzene
Reference: polystyrene
Sample concentration: 3 mg/mL
Column stationary phase: PLgel 10 μm, two MIXED-B columns (available from Polymer Laboratories) in series
Column temperature: 135° C.

In terms of the productivity and modifying effect of the block polymer (X) to be described later, the double bond number per 1000 carbon atoms in the polyolefin (A) (number of carbon-carbon double bonds at molecular ends and in the molecular chain in the polyolefin (A)) is 0.01 to 8.0, preferably 0.5 to 7.0, still more preferably 1.0 to 5.0.

Herein, the double bond number in the polyolefin (A) can be determined from the $^1$H-NMR spectrum of the polyolefin (A). Specifically, the peaks in the spectrum are first assigned. Based on the integral value derived from the double bonds in the polyolefin (A) at 4.5 to 6 ppm and the integral value derived from the polyolefin (A), the relative value between the double bond number in the polyolefin (A) and the carbon number in the polyolefin (A) are determined, calculating the number of double bonds at molecular ends and in the molecular chain per 1000 carbon atoms in the polyolefin (A). Calculation of the double bond number in the examples to be described later follows this method.

Examples of methods for producing the polyolefin (A) include the following:

(1) thermal decomposition of a polyolefin (A0) having a high molecular weight (preferably Mn=60000 to 1000000, more preferably Mn=80000 to 250000); and (2) polymerization of an α-olefin in the presence of a polymerization catalyst.

In terms of the productivity, preferred among the methods (1) and (2) is the method (1).

The thermal decomposition includes: (1) a method of heating the high molecular weight polyolefin (A0), for example, at 300° C. to 450° C. for 0.1 to 10 hours in the absence of an organic peroxide; and (2) a method of heating the high molecular weight polyolefin (A0), for example, at 180° C. to 300° C. for 0.5 to 10 hours in the presence of an organic peroxide such as 2,5-dimethyl-2,5-di(t-butylperoxy) hexane.

In terms of the industry and the productivity of the block polymer (X), preferred is the method (1) which can more easily provide a polyolefin having a greater number of double bonds at molecular ends and in the molecular chain.

A higher thermal decomposition temperature or a longer thermal decomposition time in the thermal decomposition tends to cause the polyolefin (A) to have a greater double bond number per 1000 carbon atoms.

A lower Mn of the high molecular weight polyolefin (A0), a higher thermal decomposition temperature, or a longer thermal decomposition time tends to cause the polyolefin (A) to have a lower Mn.

A higher isotacticity of the high molecular weight polyolefin (A0) tends to cause the polyolefin (A) to have a higher isotacticity.

One polyolefin (A) may be used alone or two or more polyolefins (A) may be used in combination.

<Polyolefin (B)>

The polyolefin (B) is a polyolefin that contains a C3-C8 α-olefin as a structural monomer with the α-olefin portions having an isotacticity of 1 to 65% and that has a number average molecular weight of 1000 to 200000.

Examples of the α-olefin include propylene, 1-butene, 1-pentene, 1-hexene, 1-heptene, and 1-octene.

In terms of the modifying effect of the block polymer (X) to be described later, the α-olefin is preferably propylene, 1-butene, 1-hexene, or 1-octene, more preferably propylene or 1-butene, particularly preferably propylene.

The polyolefin (B) may contain a different monomer as a structural monomer in addition to the α-olefin. In this case, the weight of the different monomer is preferably 80 wt % or less, more preferably 50 wt % or less, still more preferably 20 wt % or less based on the weight of all monomers defining the polyolefin (B).

Examples of the different monomer defining the polyolefin (B) include ethylene, 2-butene, C9-C30 α-olefins such as 1-decene and 1-dodecene, and C4-C30 unsaturated monomers other than the α-olefins, such as vinyl acetate.

The different monomer is preferably ethylene. Also, the polyolefin (B) is preferably a propylene/ethylene copolymer, a propylene/1-butene copolymer, or an ethylene/1-octene copolymer, more preferably a propylene/ethylene copolymer.

In terms of the modifying effect of the block polymer (X) to be described later, the isotacticity of the α-olefin portions in the polyolefin (B) is 1 to 65%, preferably 1 to 50%, more preferably 1 to 35%.

The isotacticity of the α-olefin portions in the polyolefin (B) tends to be directly reflected in the isotacticity of the α-olefin portions in an acid-modified polyolefin (BE), a hydroxy group-modified polyolefin (BG), an aminocarboxylic acid-modified polyolefin (BJ), an epoxy group-modified polyolefin (BQ), or an isocyanate group-modified polyolefin (BM) to be described later.

The isotacticity of the polyolefin (B) can be determined by $^{13}$C-NMR similarly to the isotacticity of the polyolefin (A).

In terms of the modifying effect of the block polymer (X), the number average molecular weight (Mn) of the polyolefin (B) is preferably 1000 to 200000, more preferably 1500 to 100000, particularly preferably 2000 to 50000.

The Mn of the polyolefin (B) can be measured by GPC as in the case of the Mn of the polyolefin (A).

In terms of the productivity of the block polymer (X) to be described later, the double bond number per 1000 carbon atoms in the polyolefin (B) (number of carbon-carbon double bonds at molecular ends and in the molecular chain in the polyolefin (B)) is preferably 0.01 to 8.0, more preferably 0.5 to 7.0, particularly preferably 1.0 to 5.0.

The double bond number per 1000 carbon atoms in the polyolefin (B) can be determined by $^{1}$H-NMR as in the case of the double bond number per 1000 carbon atoms in the polyolefin (A).

An example of a method for producing the polyolefin (B) is thermal decomposition of a polyolefin (B0) having a high molecular weight (Preferably Mn=60000 to 1000000, more preferably Mn=80000 to 800000).

The relation between the polyolefin (B) and the polyolefin (B0) is the same as the relation between the polyolefin (A) and the polyolefin (A0).

The conditions in the method for producing the polyolefin (B) from the polyolefin (B0) are the same as the conditions in the method for producing the polyolefin (A) from the polyolefin (A0).

One polyolefin (B) may be used alone or two or more polyolefins (B) may be used in combination.

<Block Polymer (X)>

The block polymer (X) of the present invention is a block polymer containing, as structural units, a polyolefin structure derived from the polyolefin (A) and a polyolefin structure derived from the polyolefin (B).

Useful as a Modifier for a Ther

The block polymer (X) of the present invention is moplastic resin (Y) to be described later (in particular, a modifier for polyolefin resin) and can improve the mechanical strength, such as tensile strength, flexural strength, and impact strength, of the thermoplastic resin (Y).

In other words, the block polymer (X) is a block polymer containing, as structural units, the polyolefin (A) and the polyolefin (B).

The block polymer (X) of the present invention may be obtainable by, for example, reacting the polyolefin (A) and the polyolefin (B). This method corresponds to a method for producing the block polymer (X) of the present invention.

The reaction of the polyolefin (A) and the polyolefin (B)

may be performed by a known method. Also, a binder (γ) to be described later may be used in the reaction of the polyolefin (A) and the polyolefin (B).

In terms of the modifying effect of the block polymer (X), the polyolefin (A) and the polyolefin (B) in the block polymer (X) have a weight ratio (A)/(B) of preferably 5/95 to 99/1, more preferably 10/90 to 90/10, particularly preferably 25/75 to 75/25.

In terms of the modifying effect and productivity of the block polymer (X), the number average molecular weight (Mn) of the block polymer (X) is preferably 3000 to 500000, more preferably 4000 to 300000, particularly preferably 5000 to 150000.

The block polymer (X) may have a structure in which a polyolefin structure derived from the polyolefin (A) and a polyolefin structure derived from the polyolefin (B) are bonded via the following binder (γ).

The binder (γ) includes at least one (preferably at least two) selected from the group consisting of an unsaturated (poly)carboxylic acid (anhydride) (C), a hydroxy group-containing compound (F), an epoxy group-containing compound (P), an isocyanate group-containing compound (L), a carboxyl group-containing compound (K), and an aminocarboxylic acid (H).

Preferred among these binding agents (γ) is a combination of an unsaturated (poly)carboxylic acid (anhydride) (C) and at least one selected from the group consisting of a hydroxy group-containing compound (F) and an aminocarboxylic acid (H).

The structure of the block polymer (X) is preferably any of the following structures (1) to (3), more preferably the structure (1) or (2), particularly preferably the structure (2).

(1) [(A)-(B)]n block polymer (n=1 to 5)

(2) (A)-(B)-(A) block polymer (3) (B)-(A)-(B) block polymer

The Mn of the block polymer (X) and the structure of the block polymer (X) can be adjusted as appropriate by the Mn and weight of the polyolefin (A), the Mn and weight of the polyolefin (B), the type and weight of the binder (γ) to be described later, and the reaction conditions.

An example of a method for producing the block polymer (X) is a method in which an acid-modified polyolefin (AE), a hydroxy group-modified polyolefin (AG), an aminocarboxylic acid-modified polyolefin (AJ), an isocyanate group-modified polyolefin (AM), or an epoxy group-modified polyolefin (AQ) to be described later and an acid-modified polyolefin (BE), a hydroxy group-modified polyolefin (BG), an aminocarboxylic acid-modified polyolefin (BJ), an isocyanate group-modified polyolefin (BM), or an epoxy group-modified polyolefin (BQ) to be described later are reacted with each other under known conditions.

The acid-modified polyolefin (AE) may be, for example, a reaction product of a polyolefin (A) and an unsaturated (poly)carboxylic acid (anhydride) (C) or a carboxyl group-containing compound (K).

The hydroxy group-modified polyolefin (AG) may be, for example, a reaction product of an acid-modified polyolefin (AE) and a hydroxy group-containing compound (F) or of a polyolefin (A) and a hydroxy group-containing compound (F).

The aminocarboxylic acid-modified polyolefin (AJ) may be, for example, a reaction product of an acid-modified polyolefin (AE) and an aminocarboxylic acid (H).

The isocyanate group-modified polyolefin (AM) may be, for example, a reaction product of a hydroxy group-modified polyolefin (AG) and an isocyanate group-containing compound (L).

The epoxy group-modified polyolefin (AQ) may be, for example, a reaction product of a polyolefin (A) and an epoxy group-containing compound (P).

Similarly, the acid-modified polyolefin (BE) may be, for example, a reaction product of a polyolefin (B) and an unsaturated (poly)carboxylic acid (anhydride) (C) or a carboxyl group-containing compound (K).

The hydroxy group-modified polyolefin (BG) may be, for example, a reaction product of an acid-modified polyolefin (BE) and a hydroxy group-containing compound (F) or of a polyolefin (B) and a hydroxy group-containing compound (F).

The aminocarboxylic acid-modified polyolefin (BJ) may be, for example, a reaction product of an acid-modified polyolefin (BE) and an aminocarboxylic acid (H).

The isocyanate group-modified polyolefin (BM) may be, for example, a reaction product of a hydroxy group-modified polyolefin (BG) and an isocyanate group-containing compound (L).

The epoxy group-modified polyolefin (BQ) may be, for example, a reaction product of a polyolefin (B) and an epoxy group-containing compound (P).

In other words, examples of the combination for the binder (γ) include
a combination of (C) and (F),
a combination of (C), (F), and (H),
a combination of (C), (F), and (L),
a combination of (C), (F), and (P),
a combination of (C) and (H),
a combination of (C), (H), and (P),
a combination of (C), (H), (F), and (L),
a combination of (C), (H), (F), and (P),
a combination of (C) and (P),
a combination of (F) and (H),
a combination of (F) and (L),
a combination of (F) and (P),
a combination of (K) and (F),
a combination of (K), (F), and (H),
a combination of (K), (F), and (L), and
a combination of (K), (F), and (P).

Preferred among these is a combination of (C), (F), and (H).

The block polymer (X) of the present invention may be obtainable by, for example, reacting the polyolefin (A) and the polyolefin (B) by a known method. This method corresponds to a method for producing the block polymer (X) of the present invention. The binder (γ) may be used in the reaction of the polyolefin (A) and the polyolefin (B).

Specific examples of methods for producing the block polymer (X) include the following.

(1) An acid-modified polyolefin (AE) and a hydroxy group-modified polyolefin (BG) are reacted with each other. In this case, an ester bond is formed.

(2) An acid-modified polyolefin (BE) and a hydroxy group-modified polyolefin (AG) are reacted with each other. In this case, an ester bond is formed.

(3) An aminocarboxylic acid-modified polyolefin (AJ) and a hydroxy group-modified polyolefin (BG) are reacted with each other. In this case, an amide bond and/or an imide bond as well as an ester bond are formed.

(4) An aminocarboxylic acid-modified polyolefin (BJ) and a hydroxy group-modified polyolefin (AG) are reacted with each other. In this case, an amide bond and/or an imide bond as well as an ester bond are formed.

(5) A hydroxy group-modified polyolefin (AG) and an isocyanate group-modified polyolefin (BM) are reacted with each other. In this case, an amide bond and/or an imide bond as well as a urethane bond are formed.

(6) A hydroxy group-modified polyolefin (BG) and an isocyanate group-modified polyolefin (AM) are reacted with each other. In this case, an amide bond and/or an imide bond as well as a urethane bond are formed.

(7) An acid-modified polyolefin (AE) and an epoxy group-modified polyolefin (BQ) are reacted with each other. In this case, an ester bond is formed.

(8) An acid-modified polyolefin (BE) and an epoxy group-modified polyolefin (AQ) are reacted with each other. In this case, an ester bond is formed.

(9) An aminocarboxylic acid-modified polyolefin (AJ) and an epoxy group-modified polyolefin (BQ) are reacted with each other. In this case, an amide bond and/or an imide bond as well as an ester bond are formed.

(10) An aminocarboxylic acid-modified polyolefin (BJ) and an epoxy group-modified polyolefin (AQ) are reacted with each other. In this case, an amide bond and/or an imide bond as well as an ester bond are formed.

(11) A hydroxy group-modified polyolefin (AG) and an epoxy group-modified polyolefin (BQ) are reacted with each other. In this case, an ether bond is formed.

(12) A hydroxy group-modified polyolefin (BG) and an epoxy group-modified polyolefin (AQ) are reacted with each other. In this case, an ether bond is formed.

<Acid-Modified Polyolefin (AE) and Acid-Modified Polyolefin (BE)>

The acid-modified polyolefin (AE) may be, for example, a reaction product of a polyolefin (A) and an unsaturated (poly)carboxylic acid (anhydride) (C) or a carboxyl group-containing compound (K).

The acid-modified polyolefin (BE) may be, for example, a reaction product of a polyolefin (B) and an unsaturated (poly)carboxylic acid (anhydride) (C) or a carboxyl group-containing compound (K).

In the above reaction, a radical initiator (f) such as dicumyl peroxide may be used.

The unsaturated (poly)carboxylic acid (anhydride) (C) includes an unsaturated monocarboxylic acid, an unsaturated polycarboxylic acid, and/or an unsaturated polycarboxylic anhydride.

The unsaturated (poly)carboxylic acid (anhydride) (C) preferably includes a C3-C24 monocarboxylic acid containing one polymerizable unsaturated group, a C4-C24 polycarboxylic acid containing one polymerizable unsaturated group, and/or a C4-C24 polycarboxylic anhydride containing one polymerizable unsaturated group.

For the unsaturated (poly)carboxylic acid (anhydride) (C), examples of the unsaturated monocarboxylic acid include aliphatic monocarboxylic acids (C3-C24, e.g., acrylic acid, methacrylic acid, α-ethylacrylic acid, crotonic acid, isocrotonic acid) and alicyclic monocarboxylic acids (C6-C24, e.g., cyclohexenecarboxylic acid); examples of the unsaturated poly(2 or 3, or higher) carboxylic acid or an acid anhydride thereof include unsaturated dicarboxylic acids and acid anhydrides thereof, such as aliphatic dicarboxylic acids and acid anhydrides thereof (C4-C24, e.g., maleic acid, fumaric acid, itaconic acid, citraconic acid, mesaconic acid, and acid anhydrides thereof) and alicyclic dicarboxylic acids and acid anhydrides thereof (C8-C24, e.g., cyclohexenedicarboxylic acid, cycloheptenedicarboxylic acid, bicycloheptenedicarboxylic acid, methyltetrahydrophthalic acid, and acid anhydrides thereof). One of these unsaturated (poly)carboxylic acids (anhydrides) (C) may be used alone, or two or more thereof may be used in combination.

In terms of the reactivity between the polyolefin (A) and the polyolefin (B) and the mechanical strength, the unsaturated (poly)carboxylic acid (anhydride) (C) is preferably an unsaturated dicarboxylic anhydride, more preferably a maleic anhydride.

The carboxyl group-containing compound (K) may be one that contains no unsaturated group, that contains one or more carboxyl groups in the molecule, and that contains a functional group reactive with the polyolefin (A) or the polyolefin (B) in addition to the carboxyl group(s).

Examples of the carboxyl group-containing compound (K) include mercaptoacetic acid, 3-mercaptopropanoic acid, and 2-mercaptopropanoic acid.

The carboxyl group-containing compound (K) is preferably mercaptoacetic acid.

In terms of the productivity of the block polymer (X), the acid value (mgKOH/g) of each of the acid-modified polyolefin (AE) and the acid-modified polyolefin (BE) is preferably 1 to 100 mgKOH/g, more preferably 3 to 75 mgKOH/g, particularly preferably 5 to 50 mgKOH/g. The acid value is a value measured in conformity with JIS K0070:1992.

The acid value can be adjusted as appropriate by the double bond number in the polyolefin (A) or the polyolefin (B), the weight of the polyolefin (A) or the polyolefin (B), or the type and weight of the unsaturated (poly)carboxylic acid (anhydride) (C) or the carboxyl group-containing compound (K).

<Hydroxy Group-Modified Polyolefin (AG) and Hydroxy Group-Modified Polyolefin (BG)>

The hydroxy group-modified polyolefin (AG) may be, for example, a reaction product of an acid-modified polyolefin (AE) and a hydroxy group-containing compound (F) or a reaction product of a polyolefin (A) and a hydroxy group-containing compound (F).

The hydroxy group-modified polyolefin (BG) may be, for example, a reaction product of an acid-modified polyolefin (BE) and a hydroxy group-containing compound (F) or a reaction product of a polyolefin (B) and a hydroxy group-containing compound (F).

The hydroxy group-containing compound (F) may be one that contains one or more hydroxy groups in the molecule and that contains a functional group reactive with an acid-modified polyolefin (AE), an acid-modified polyolefin (BE), a polyolefin (A), or a polyolefin (B) in addition to the hydroxy group(s).

Examples of the hydroxy group-containing compound (F) include 2-aminoethanol, 3-aminopropanol, 4-aminobutanol, 2- or 3-hydropiperazine, 2-, 3-, or 4-aminocyclohexanol, 2-, 3-, or 4-aminophenol, 2- or 3-amino-p-cresol, 2- or 4-amino-m-cresol, 3- or 4-amino-o-cresol, and 2-mercaptoethanol.

In terms of the reactivity, the hydroxy group-containing compound (F) is preferably 2-aminoethanol, 3-aminopropanol, 4-aminobutanol, or 2-mercaptoethanol, more preferably 2-aminoethanol or 2-mercaptoethanol.

In terms of the productivity of the block polymer (X), the hydroxyl value of each of the hydroxy group-modified polyolefin (AG) and the hydroxy group-modified polyolefin (BG) is preferably 1 to 100 mgKOH/g, more preferably 3 to 75 mgKOH/g, particularly preferably 5 to 50 mgKOH/g. The hydroxyl value is a value measured in conformity with JIS K0070:1992.

The hydroxyl value can be adjusted as appropriate by, for example, the types and weights of the acid-modified polyolefin (AE) and the acid-modified polyolefin (BE), and the type and weight of the hydroxy group-containing compound (F).

<Epoxy Group-Modified Polyolefin (AQ) and Epoxy Group-Modified Polyolefin (BQ)>

The epoxy group-modified polyolefin (AQ) may be, for example, a reaction product of a polyolefin (A) and an epoxy group-containing compound (P).

The epoxy group-modified polyolefin (BQ) may be, for example, a reaction product of a polyolefin (B) and an epoxy group-containing compound (P).

The epoxy group-containing compound (P) may be one that contains one or more epoxy groups in the molecule and that contains a functional group reactive with the polyolefin (A) or the polyolefin (B) in addition to the epoxy group(s).

Examples of the epoxy group-containing compound include glycidyl acrylate and glycidyl methacrylate.

In terms of the productivity of the block polymer (X), the epoxy equivalent (g/eq) of each of the epoxy group-modified polyolefin (AQ) and the epoxy group-modified polyolefin (BQ) is preferably 500 to 100000 g/eq, more preferably 650 to 50000 g/eq, particularly preferably 800 to 20000 g/eq. The epoxy equivalent is a value measured in conformity with JIS K7236:2001.

The epoxy equivalent can be adjusted as appropriate by the types and weights of the polyolefin (A) and the polyolefin (B) and the type and weight of the epoxy group-containing compound (P).

<Isocyanate Group-Modified Polyolefin (AM) and Isocyanate Group-Modified Polyolefin (BM)>

The isocyanate group-modified polyolefin (AM) may be, for example, a reaction product of a hydroxy group-modified polyolefin (AG) and an isocyanate group-containing compound (L).

The isocyanate group-modified polyolefin (BM) may be, for example, a reaction product of a hydroxy group-modified polyolefin (BG) and an isocyanate group-containing compound (L).

The isocyanate group-containing compound (L) may be one that contains one or more isocyanate groups in the molecule.

Examples of the isocyanate group-containing compound (L) include hexamethylene diisocyanate, diphenylmethane diisocyanate, and isophorone diisocyanate.

In terms of the productivity of the block polymer (X), the isocyanate group content (wt %) of each of the isocyanate group-modified polyolefin (AM) and the isocyanate group-modified polyolefin (BM) is preferably 0.04 to 8.5%, more preferably 0.08 to 6.0%, particularly preferably 0.2 to 5.0%. The isocyanate group content is a value measured in conformity with JIS K1603-1:2007.

The isocyanate group content can be adjusted as appropriate by the types and weights of the hydroxy group-modified polyolefin (AG) and the hydroxy group-modified polyolefin (BG) and the type and weight of the isocyanate group-containing compound (L).

<Aminocarboxylic Acid-Modified Polyolefin (AJ) and Aminocarboxylic Acid-Modified Polyolefin (BJ)>

The aminocarboxylic acid-modified polyolefin (AJ) may be, for example, a reaction product of an acid-modified polyolefin (AE) and an aminocarboxylic acid (H).

example, a reaction product of an acid-modified polyolefi The aminocarboxylic acid-modified polyolefin (BJ) may be, for n (BE) and an aminocarboxylic acid (H).

Examples of the aminocarboxylic acid (H) include 12-aminododecanoic acid and 6-aminohexanoic acid.

In terms of the productivity of the block polymer (X), the acid value (mgKOH/g) of each of the aminocarboxylic acid-modified polyolefin (AJ) and the aminocarboxylic acid-modified polyolefin (BJ) is preferably 1 to 100 mgKOH/g, more preferably 3 to 75 mgKOH/g, particularly preferably 5 to 50 mgKOH/g.

The acid value can be adjusted as appropriate by the types and weights of the acid-modified polyolefin (AE) and the acid-modified polyolefin (BE) and the type and weight of the aminocarboxylic acid (H).

The block polymer (X) of the present invention gives excellent mechanical strength, such as tensile strength, flexural strength, and impact strength, to a molded article of a thermoplastic resin composition (Z) to be described later and gives excellent mechanical strength to a recycled polyolefin resin (YR).

Thus, the block polymer (X) of the present invention can suitably be used as a modifier for thermoplastic resin, in particular a modifier for polyolefin resin.

<Thermoplastic Resin Composition (Z)>

The thermoplastic resin composition (Z) of the present invention contains the block polymer (X) and a thermoplastic resin (Y).

In terms of the modifying characteristics of the block polymer (X) and the mechanical strength of a molded article to be described later, the block polymer (X) and the thermoplastic resin (Y) in the thermoplastic resin composition (Z) of the present invention have a weight ratio (X)/(Y) of preferably 1/99 to 50/50, more preferably 3/97 to 20/80.

Examples of the thermoplastic resin (Y) includes polyolefin resins such as polypropylene, low-density polyethylene, and high-density polyethylene, polystyrene resin, polyester resin, and nylon resin, other than the block polymer (X).

The thermoplastic resin (Y) is preferably a polyolefin resin.

As described above, the thermoplastic resin (Y) is also preferably a recycled polyolefin resin (YR). The recycled polyolefin resin (YR) is preferably a polyolefin resin obtainable by molding and subsequent treatment such as crushing, pulverization, or pelletizing.

In terms of the mechanical strength of a molded article and the miscibility with the block polymer (X), the Mn of the thermoplastic resin (Y) is preferably 10000 to 1000000, more preferably 20000 to 400000, still more preferably 80000 to 300000.

If necessary, the thermoplastic resin composition (Z) of the present invention may further contain one or two or more additives (N) selected from the group consisting of a filler (N1), a colorant (N2), a matting agent (N3), an antistatic (N4), a dispersant (N5), a flame retardant (N6), a foaming agent (N7), an antioxidant (N8), an ultraviolet absorber (N9), and a plasticizer (N10) to the extent that the one or two or more additives do not inhibit the effects of the present invention.

Examples of the filler (N1) include organic fillers such as wood flour and cellulose and inorganic fillers such as calcium carbonate, talc, glass fiber, and carbon fiber.

In terms of the mechanical strength, the filler (N1) is preferably an inorganic filler, more preferably calcium carbonate. The amount of the filler (N1) based on the total weight of the thermoplastic resin composition (Z) is preferably 3 to 70 wt %, more preferably 3 to 50 wt %, still more preferably 5 to 40 wt %.

The total amount of the additives (N2) to (N10) used in the thermoplastic resin composition (Z) of the present invention may be preferably, for example, 30 wt % or less based on the total weight of the block polymer (X). In terms of exhibition of the functions of the additives (N) and the industry, the total amount is more preferably 0.1 to 20 wt %.

For the amounts of the respective additives (N) other than the filler (N1) based on the total weight of the thermoplastic resin composition (Z), the amount of the colorant (N2) may be, for example, preferably 10 wt % or less, more preferably 0.1 to 5 wt %; the amount of the matting agent (N3) may be, for example, preferably 20 wt % or less, more preferably 0.1 to 10 wt %; the amount of the antistatic (N4) may be, for example, preferably 10 wt % or less, more preferably 0.1 to 5 wt %; the amount of the dispersant (N5) may be, for example, preferably 20 wt % or less, more preferably 0 to 15 wt %, still more preferably 0 to 10 wt %; the amount of the flame retardant (N6) may be, for example, preferably 15 wt % or less, more preferably 3 to 10 wt %; the amount of the foaming agent (N7) may be, for example, preferably 1 to 20 wt %, more preferably 5 to 15 wt %; the amount of the antioxidant (N8) may be, for example, preferably 3 wt % or less, more preferably 0.01 to 1 wt %; the amount of the ultraviolet absorber (N9) may be, for example, preferably 3 wt % or less, more preferably 0.01 to 1 wt %; and the amount of the plasticizer (N10) may be, for example, preferably 20 wt % or less, more preferably 5 to 15 wt %.

If the same additive is used for multiple categories of the additives (N1) to (N10), each additive is used not in an amount to achieve the target effect thereof regardless of the effect that the additive achieves as a different additive, but in an amount adjusted in accordance with the intended use while taking into consideration that the additive also achieves the effect as a different additive.

Examples of methods for producing the thermoplastic resin composition (Z) of the present invention include:

(1) a method in which the whole amounts of the thermoplastic resin (Y) and the block polymer (X) and optionally any additives (N) are mixed at one time to provide a resin composition (bulk method); and (2) a method in which part of the thermoplastic resin (Y), the whole amount of the block polymer (X), and optionally part of or the whole amount of any additives (N) are mixed to form a masterbatch resin composition containing the block polymer (X) in a high concentration, and then the remaining thermoplastic resin (Y) and optionally the remaining additives (N) are added to and mixed with the masterbatch to provide a resin composition (masterbatch method).

In terms of the efficiency of mixing the block polymer (X), the method (2) is preferred.

<Molded Article>

The molded article of the present invention is a molded article of the thermoplastic resin composition (Z). In other words, the molded article of the present invention is a product of molding the thermoplastic resin composition (Z) of the present invention.

Examples of molding methods include injection molding, compression molding, calender molding, slush molding, rotational molding, extrusion molding, blow molding, and film molding such as casting, tentering, and blown film molding. Molding may be achieved by any method including, for example, single-layer molding, multi-layer molding, or foam molding in accordance with the purpose. Examples of the shape of the molded article include a plate shape, a sheet shape, a film shape, and a fibrous shape (including nonwoven fabric).

EXAMPLES

The present invention will be described in more detail below with reference to examples, but the present invention is not limited thereto. In the examples, "part(s)" means "part(s) by weight". In the examples, the number average molecular weight (Mn) as well as the double bond number, isotacticity, acid value, hydroxyl value, epoxy equivalent, and isocyanate group content of each polyolefin were measured by the aforementioned methods.

Production Example 1

A reaction vessel was charged with 100 parts of a high molecular weight polyolefin (A0-1) (trade name: "SunAllomer PZA20A", available from SunAllomer Ltd.). With a nitrogen stream to the liquid phase, the polyolefin was melted by heat using a mantle heater. The melt was thermally decomposed at 350° C. for 15 minutes under stirring, whereby a polyolefin (A-1) was obtained.

The polyolefin (A-1) had a Mn of 30000, a double bond number at molecular ends and in the molecular chain of 0.5 per 1000 carbon atoms, and an isotacticity of 95%.

Production Examples 2 to 5

Thermal decomposition was performed as in Production Example 1 except that the high molecular weight polyolefin (A0) and the thermal decomposition conditions (temperature and time) were changed according to Table 1, whereby polyolefins (A-2) to (A-5) were obtained. The results are shown in Table 1.

Production Example 6

A reaction vessel was charged with 100 parts of a high molecular weight polyolefin (B0-1) (trade name: "Vistamaxx6102", available from ExxonMobil Corp.). With a nitrogen stream to the liquid phase, the polyolefin was melted by heat using a mantle heater. The melt was thermally decomposed at 350° C. for 10 minutes under stirring, whereby a polyolefin (B-1) was obtained.

The polyolefin (B-1) had a Mn of 30000, a double bond number at molecular ends and in the molecular chain of 0.5 per 1000 carbon atoms, and an isotacticity of 28%.

Production Examples 7 to 12

Thermal decomposition was performed as in Production Example 6 except that the high molecular weight polyolefin (B0) and the thermal decomposition conditions (temperature and time) were changed according to Table 1, whereby polyolefins (B-2) to (B-7) were obtained. The results are shown in Table 1.

TABLE 1

| | | Production Example 1 | Production Example 2 | Production Example 3 | Production Example 4 | Production Example 5 | Production Example 6 |
|---|---|---|---|---|---|---|---|
| Polyolefin (A) | | A-1 | A-2 | A-3 | A-4 | A-5 | — |
| Polyolefin (B) | | — | — | — | — | — | B-1 |
| Polyolefin (A0) | A0-1 | 100 | 100 | 100 | — | — | — |
| | A0-2 | — | — | — | 100 | — | — |
| | A0-3 | — | — | — | — | 100 | — |
| Polyolefin (B0) | B0-1 | — | — | — | — | — | 100 |
| | B0-2 | — | — | — | — | — | — |
| | B0-3 | — | — | — | — | — | — |
| | B0-4 | — | — | — | — | — | — |
| | B0-5 | — | — | — | — | — | — |
| | B0-6 | — | — | — | — | — | — |
| Thermal decomposition conditions | Temperature (° C.) | 350 | 360 | 370 | 360 | 370 | 350 |
| | Time (min) | 15 | 30 | 90 | 25 | 30 | 10 |
| Double bond number (bonds/1000 C) | | 0.5 | 2.7 | 7.2 | 2.7 | 0.1 | 0.5 |
| Number average molecular weight (Mn) | | 30,000 | 10,000 | 3,000 | 10,000 | 180,000 | 30,000 |
| Isotacticity (%) | | 95 | 94 | 91 | 90 | 95 | 28 |

| | | Production Example 7 | Production Example 8 | Production Example 9 | Production Example 10 | Production Example 11 | Production Example 12 |
|---|---|---|---|---|---|---|---|
| Polyolefin (A) | | — | — | — | — | — | — |
| Polyolefin (B) | | B-2 | B-3 | B-4 | B-5 | B-6 | B-7 |
| Polyolefin (A0) | A0-1 | — | — | — | — | — | — |
| | A0-2 | — | — | — | — | — | — |
| | A0-3 | — | — | — | — | — | — |
| Polyolefin (B0) | B0-1 | 100 | — | — | — | — | — |
| | B0-2 | — | 100 | — | — | — | — |
| | B0-3 | — | — | 100 | — | — | — |
| | B0-4 | — | — | — | 100 | — | — |
| | B0-5 | — | — | — | — | 100 | — |
| | B0-6 | — | — | — | — | — | 100 |

TABLE 1-continued

| | | | | | | |
|---|---|---|---|---|---|---|
| Thermal decomposition | Temperature (° C.) | 360 | 370 | 370 | 350 | 360 | 350 |
| conditions | Time (min) | 30 | 80 | 10 | 30 | 30 | 40 |
| Double bond number (bonds/1000 C) | | 2.5 | 6.1 | 2.0 | 0.4 | 0.1 | 0.1 |
| Number average molecular weight (Mn) | | 10,000 | 3,100 | 10,000 | 40,000 | 180,000 | 100,000 |
| Isotacticity (%) | | 27 | 50 | 2 | 18 | 50 | 18 |

Note:

materials used

A0-1: polyolefin containing 98 wt % propylene and 2 wt % ethylene as structural units, trade name "SunAllomer PZA20A", SunAllomer, Mn 100,000, isotacticity 96%

A0-2: metallocene-catalyzed polyolefin containing 96 wt % propylene and 4 wt % ethylene as structural units, trade name "Wintec WFX6", Japan Polypropylene, Mn 150,000, isotacticity 92%

A0-3: polyolefin containing 100 wt % propylene as structural unit, trade name "SunAllomer PS201A, SunAllomer, Mn 800,000, isotacticity 97%

B0-1: polyolefin containing 84 wt % propylene and 16 wt % ethylene as structural units, trade name "Vistamaxx 6102", ExxonMobil, Mn 70,000, isotacticity 29%

B0-2: stereorandom polyolefin containing 100 wt % propylene as structural unit, trade name "L-MODU S901", Idemitsu Kosan, Mn 50,000, isotacticity 50%

B0-3: polyolefin containing 27 wt % propylene and 73 wt % ethylene as structural units, trade name "Tafmer P0280", Mitsui Chemicals, Mn 40,000, isotacticity 3%

B0-4: polyolefin containing 80 wt % propylene and 20 wt % butene as structural units, trade name "Tafmer XM5080", Mitsui Chemicals, Mn 90,000, isotacticity 20%

B0-5: polyolefin containing 89 wt % propylene and 11 wt % ethylene as structural units, trade name "Vistamaxx 3020FL", ExxonMobil, Mn 500,000, isotacticity 55%

B0-6: polyolefin containing 20 wt % octene and 80 wt % ethylene as structural units, trade name "ENGAGE 8150", Dow Chemical, Mn 500,000, isotacticity 20%

Production Example 13

A reaction vessel was charged with 100 parts of the polyolefin (A-1) and 1 part of maleic anhydride (C-1). With a nitrogen stream, the system was heated up to 200° C. and the contents were continuously stirred for 10 hours. An unreacted portion of the maleic anhydride was then evaporated under reduced pressure (1.5 kPa), whereby an acid-modified polyolefin (AE-1) was obtained.

The acid-modified polyolefin (AE-1) had an acid value of 2.0 mgKOH/g and a Mn of 30100.

Production Examples 14 to 21

Reactions were performed as in Production Example 13 except that the polyolefin, the unsaturated (poly)carboxylic acid (anhydride) (C), and the radical initiator (f) were changed according to Table 2, whereby acid-modified polyolefins (AE-2) to (AE-4) and (BE-1) to (BE-5) were obtained. The results are shown in Table 2.

Production Example 22

A reaction vessel was charged with 100 parts of the polyolefin (A-5), 1 part of mercaptoacetic acid (K-1), and 200 parts of xylene. With a nitrogen stream, the system was heated up to 160° C. and 1 part of dicumyl peroxide (f-1) was fed thereto, and the contents were continuously stirred for 10 hours. Xylene and an unreacted portion of the mercaptoacetic acid were then evaporated under reduced pressure (1.5 kPa), whereby an acid-modified polyolefin (AE-15) was obtained.

The acid-modified polyolefin (AE-15) had an acid value of 0.3 mgKOH/g and a Mn of 180100.

Production Examples 23 and 24

Reactions were performed as in Production Example 22 except that the polyolefin and the radical initiator (f) were changed according to Table 2, whereby acid-modified polyolefins (BE-16) and (BE-17) were obtained. The results are shown in Table 2.

TABLE 2

| | | | Production Example 13 | Production Example 14 | Production Example 15 | Production Example 16 | Production Example 17 | Production Example 18 |
|---|---|---|---|---|---|---|---|---|
| Acid-modified polyolefin (AE), (BE) | | | AE-1 | AE-2 | AE-3 | AE-4 | BE-1 | BE-2 |
| Materials used (parts) | Polyolefin (A) | A-1 | 100 | — | — | — | — | — |
| | | A-2 | — | 100 | — | — | — | — |
| | | A-3 | — | — | 100 | — | — | — |
| | | A-4 | — | — | — | 100 | — | — |
| | | A-5 | — | — | — | — | — | — |
| | Polyolefin (B) | B-1 | — | — | — | — | 100 | — |
| | | B-2 | — | — | — | — | — | 100 |
| | | B-3 | — | — | — | — | — | — |
| | | B-4 | — | — | — | — | — | — |
| | | B-5 | — | — | — | — | — | — |
| | | B-6 | — | — | — | — | — | — |
| | | B-7 | — | — | — | — | — | — |
| | Unsaturated (poly)carboxylic acid (anhydride) (C) | C-1 | 1 | 3 | 6 | — | — | 3 |
| | | C-2 | — | — | — | 3 | — | — |
| | | C-3 | — | — | — | — | 1 | — |
| | | C-4 | — | — | — | — | — | — |
| | Carboxylic acid-containing compound (K) | K-1 | — | — | — | — | — | — |
| | Radical initiator (f) | f-1 | — | 1 | — | — | — | — |
| | | f-2 | — | — | — | — | 1 | — |
| Acid value (mgKOH/g) | | | 2.0 | 10.8 | 28.9 | 11.0 | 2.0 | 10.0 |
| Mn | | | 30,100 | 10,200 | 3,150 | 10,200 | 30,100 | 10,200 |
| Isotacticity (%) | | | 95 | 94 | 91 | 90 | 28 | 27 |

TABLE 2-continued

| | | | Production Example 19 | Production Example 20 | Production Example 21 | Production Example 22 | Production Example 23 | Production Example 24 |
|---|---|---|---|---|---|---|---|---|
| Acid-modified polyolefin (AE), (BE) | | | BE-3 | BE-4 | BE-5 | AE-15 | BE-16 | BE-17 |
| Materials | Polyolefin (A) | A-1 | — | — | — | — | — | — |
| used | | A-2 | — | — | — | — | — | — |
| (parts) | | A-3 | — | — | — | — | — | — |
| | | A-4 | — | — | — | — | — | — |
| | | A-5 | — | — | — | 100 | — | — |
| | Polyolefin (B) | B-1 | — | — | — | — | — | — |
| | | B-2 | — | — | — | — | — | — |
| | | B-3 | 100 | — | — | — | — | — |
| | | B-4 | — | 100 | — | — | — | — |
| | | B-5 | — | — | 100 | — | — | — |
| | | B-6 | — | — | — | — | 100 | — |
| | | B-7 | — | — | — | — | — | 100 |
| Unsaturated (poly)carboxylic | C-1 | | 6 | 3 | — | — | — | — |
| acid (anhydride) (C) | C-2 | | — | — | — | — | — | — |
| | C-3 | | — | — | — | — | — | — |
| | C-4 | | — | — | 1 | — | — | — |
| Carboxylic acid-containing | K-1 | | — | — | — | 1 | 1 | 1 |
| compound (K) | | | | | | | | |
| Radical initiator (f) | f-1 | | — | — | — | 1 | — | — |
| | f-2 | | — | — | — | — | 1 | 1 |
| Acid value (mgKOH/g) | | | 24.4 | 8.0 | 1.6 | 0.3 | 0.2 | 0.6 |
| Mn | | | 3,100 | 10,150 | 40,100 | 180,100 | 180,100 | 100,100 |
| Isotacticity (%) | | | 50 | 2 | 18 | 95 | 28 | 28 |

Note:

materials used

C-1: maleic anhydride

C-2: itaconic acid

C-3: acrylic acid

C-4: methacrylic acid

K-1: mercaptoacetic acid f-1: dicumyl peroxide f-2: 1,1'-azobis(cyclohexane-1-carbonitrile) (trade name "V-40", Wako Pure Chemical)

Production Example 25

A reaction vessel was charged with 100 parts of the polyolefin (A-3) and 7 parts of glycidyl methacrylate (P-1). With a nitrogen stream, the system was heated up to 200° C. and the contents were continuously stirred for 10 hours. An unreacted portion of the glycidyl methacrylate (P-1) was then evaporated under reduced pressure (1.5 kPa), whereby an epoxy group-modified polyolefin (AQ-3) was obtained.

The epoxy group-modified polyolefin (AQ-3) had an epoxy equivalent of 2200 g/eq and a Mn of 3200.

Production Example 26

Reactions were performed as in Production Example 25 except that the polyolefin and the radical initiator (f) were changed according to Table 3, whereby an epoxy group-modified polyolefin (BQ-3) was obtained. The results are shown in Table 3.

TABLE 3

| | | | Production Example 25 | Production Example 26 |
|---|---|---|---|---|
| Epoxy group-modified polyolefin (AQ), (BQ) | | | AQ-3 | BQ-3 |
| Materials | Polyolefin (A) | A-3 | 100 | — |
| used | Polyolefin (B) | B-3 | — | 100 |
| (parts) | Epoxy group-containing compound (P) | P-1 | 7 | 7 |
| | Radical initiator (f) | f-1 | — | 1 |
| Epoxy equivalent (g/eq) | | | 2,200 | 2,200 |
| Mn | | | 3,200 | 3,200 |
| Isotacticity (%) | | | 90 | 50 |

Note:

materials used

P-1: glycidyl methacrylate f-1: dicumyl peroxide

Production Example 27

A reaction vessel was charged with 100 parts of the acid-modified polyolefin (AE-1) and 1 part of 2-aminoethanol (F-1). With a nitrogen stream, the system was heated up to 180° C. and the contents were continuously stirred for 10 hours. The stirring was continued for another 10 hours under reduced pressure (1.5 kPa), whereby a hydroxy group-modified polyolefin (AG-1) was obtained.

The hydroxy group-modified polyolefin (AG-1) had a hydroxyl value of 2.0 mgKOH/g and a Mn of 30000.

Production Examples 28 to 32

Reactions were performed as in Production Example 27 except that the acid-modified polyolefin (AE) and the acid-modified polyolefin (BE) were changed according to Table 4, whereby hydroxy group-modified polyolefins (AG-2), (BG-1), (BG-2), (BG-16), and (BG-17) were obtained. The results are shown in Table 4.

Production Example 33

A reaction vessel was charged with 100 parts of the acid-modified polyolefin (AE-3) and 10 parts of 12-ami-nododecanoic acid (H-1). With a nitrogen stream, the system was heated up to 180° C. and the contents were continuously stirred for 10 hours. The stirring was continued for another 10 hours under reduced pressure (1.5 kPa), whereby an aminocarboxylic acid-modified polyolefin (AJ-3) was obtained.

The aminocarboxylic acid-modified polyolefin (AJ-3) had an acid value of 26.2 mgKOH/g and a Mn of 3500.

Production Examples 34 to 37

Reactions were performed as in Production Example 33 except that the acid-modified polyolefin (AE), the acid-modified polyolefin (BE), and the aminocarboxylic acid (H) were changed according to Table 4, whereby aminocarboxylic acid-modified polyolefins (AJ-4) and (BJ-3) to (BJ-5) were obtained. The results are shown in Table 4.

TABLE 4

| | | | Production Example 27 | Production Example 28 | Production Example 29 | Production Example 30 | Production Example 31 | Production Example 32 |
|---|---|---|---|---|---|---|---|---|
| Hydroxy group-modified polyolefin (AG), (BG) | | | AG-1 | AG-2 | BG-1 | BG-2 | BG-16 | BG-17 |
| Aminocarboxylic acid-modified polyolefin (AJ), (BJ) | | | — | — | — | — | — | — |
| Materials used (parts) | Acid-modified polyolefin (AE), (BE) | AE-1 | 100 | — | — | — | — | — |
| | | AE-2 | — | 100 | — | — | — | — |
| | | AE-3 | — | — | — | — | — | — |
| | | AE-4 | — | — | — | — | — | — |
| | | BE-1 | — | — | 100 | — | — | — |
| | | BE-2 | — | — | — | 100 | — | — |
| | | BE-3 | — | — | — | — | — | — |
| | | BE-4 | — | — | — | — | — | — |
| | | BE-5 | — | — | — | — | — | — |
| | | BE-16 | — | — | — | — | 100 | — |
| | | BE-17 | — | — | — | — | — | 100 |
| Hydroxy group-containing compound (F) | | F-1 | 1 | 2 | 1 | 2 | 1 | 1 |
| Aminocarboxylic acid (H) | | H-1 | — | — | — | — | — | — |
| | | H-2 | — | — | — | — | — | — |
| Hydroxyl value (mgKOH/g) | | | 2.0 | 10.7 | 2.0 | 9.9 | 0.2 | 0.6 |
| Acid value (mgKOH/g) | | | — | — | — | — | — | — |
| Mn | | | 30,000 | 10,200 | 30,100 | 10,100 | 18,100 | 10,200 |
| Isotacticity (%) | | | 95 | 94 | 27 | 27 | 50 | 18 |

| | | | Production Example 33 | Production Example 34 | Production Example 35 | Production Example 36 | Production Example 37 |
|---|---|---|---|---|---|---|---|
| Hydroxy group-modified polyolefin (AG), (BG) | | | — | — | — | — | — |
| Aminocarboxylic acid-modified polyolefin (AJ), (BJ) | | | AJ-3 | AJ-4 | BJ-3 | BJ-4 | BJ-5 |
| Materials used (parts) | Acid-modified polyolefin (AE), (BE) | AE-1 | — | — | — | — | — |
| | | AE-2 | — | — | — | — | — |
| | | AE-3 | 100 | — | — | — | — |
| | | AE-4 | — | 100 | — | — | — |
| | | BE-1 | — | — | — | — | — |
| | | BE-2 | — | — | — | — | — |
| | | BE-3 | — | — | 100 | — | — |
| | | BE-4 | — | — | — | 100 | — |
| | | BE-5 | — | — | — | — | 100 |
| | | BE-16 | — | — | — | — | — |
| | | BE-17 | — | — | — | — | — |
| Hydroxy group-containing compound (F) | | F-1 | — | — | — | — | — |
| Aminocarboxylic acid (H) | | H-1 | 10 | 10 | 10 | — | — |
| | | H-2 | — | — | — | 10 | 10 |
| Hydroxyl value (mgKOH/g) | | | — | — | — | — | — |
| Acid value (mgKOH/g) | | | 26.2 | 9.8 | 22.2 | 7.3 | 1.5 |
| Mn | | | 3,500 | 11,000 | 3,300 | 11,000 | 40,100 |
| Isotacticity (%) | | | 91 | 90 | 50 | 2 | 18 |

Note:
materials used
F-1: 2-aminoethanol
H-1: 12-aminododecanoic acid
H-2: 6-aminohexanoic acid

Production Example 38

A reaction vessel was charged with 100 parts of the polyolefin (A-1), 2 parts of 2-mercaptoethanol (F-2), and 200 parts of xylene. With a nitrogen stream, the system was heated up to 160° C. and 1 part of dicumyl peroxide (f-1) was fed thereto, and the contents were continuously stirred for 10 hours. Xylene and an unreacted portion of the 2-mercaptoethanol (F-2) were then evaporated under reduced pressure (1.5 kPa), whereby a hydroxy group-modified polyolefin (AG-11) was obtained.

The hydroxy group-modified polyolefin (AG-11) had a hydroxyl value of 2.0 mgKOH/g and a Mn of 30100.

Production Example 39

Reactions were performed as in Production Example 38 except that the polyolefin and the radical initiator (f) were changed according to Table 5, whereby a hydroxy group-modified polyolefin (BG-11) was obtained. The results are shown in Table 5.

TABLE 5

| | | | Production Example 38 | Production Example 39 |
|---|---|---|---|---|
| | Hydroxy group-modified polyolefin (AG), (BG) | | AG-11 | BG-11 |
| Materials used (parts) | Polyolefin (A) | A-1 | 100 | — |
| | Polyolefin (B) | B-1 | — | 100 |
| | Hydroxy group-containing compound (F) | F-2 | 1 | 1 |
| | Radical initiator (f) | f-1 | 1 | — |
| | | f-2 | — | 1 |
| | Hydroxyl value (mgKOH/g) | | 2.0 | 2.0 |
| | Mn | | 30,100 | 30,100 |
| | Isotacticity (%) | | 94 | 27 |

Note:
materials used
F-2: 2-mercaptoethanol
f-1: dicumyl peroxide
f-2: 1,1'-azobis(cyclohexane-1-carbonitrile)
(trade name: "V-40", Wako Pure Chemical)

Production Example 40

A reaction vessel was charged with 100 parts of the hydroxy group-modified polyolefin (AG-2), 8 parts of hexamethylene diisocyanate (L-1), and 200 parts of xylene. With a nitrogen stream, the system was heated up to 150° C. and the contents were continuously stirred for 10 hours. Xylene and an unreacted portion of the hexamethylene diisocyanate (L-1) were then evaporated under reduced pressure (1.5 kPa), whereby an isocyanate group-modified polyolefin (AM-2) was obtained.

The isocyanate group-modified polyolefin (AM-2) had an isocyanate group content of 0.78% and a Mn of 10600.

Production Example 41

Reactions were performed as in Production Example 38 except that the hydroxy group-modified polyolefin and the isocyanate group-containing compound (L) were changed according to Table 6, whereby an isocyanate group-modified polyolefin (BM-3) was obtained. The results are shown in Table 6.

TABLE 6

| | | | Production Example 40 | Production Example 41 |
|---|---|---|---|---|
| | Isocyanate group-modified polyolefin (AM), (BM) | | AM-2 | BM-3 |
| Materials used (parts) | Hydroxy group-modified polyolefin (AG), (BG) | AG-2 | 100 | — |
| | | BG-3 | — | 100 |
| | Isocyanate group-containing compound (L) | L-1 | 8 | — |
| | | L-2 | — | 0.5 |
| | | L-3 | — | 0.5 |
| | Isocyanate group content (%) | | 0.78 | 0.15 |
| | Mn | | 10,600 | 30,500 |
| | Isotacticity (%) | | 95 | 27 |

Note:
materials used
L-1: hexamethylene diisocyanate
L-2: diphenylmethane diisocyanate
L-3: isophorone diisocyanate

Example 1

A reaction vessel was charged with 8 parts of the aminocarboxylic acid-modified polyolefin (AJ-3), 100 parts of the hydroxy group-modified polyolefin (BG-1), and 0.1 parts of dibutyltin as an esterification catalyst. The system was purged with nitrogen and heated up to 200° C. with a nitrogen stream, so that the contents were dissolved. The contents were continuously stirred at 200° C. for three hours and subjected to a reaction for five hours under reduced pressure (1.5 kPa). The product was taken from the reaction vessel, whereby a block polymer (X-1) was obtained.

The block polymer (X-1) had a Mn of 62000, a weight ratio (A)/(B) of 7/93, and an acid value of 0.01 mgKOH/g.

Examples 2 to 5

Reactions were performed as in Example 1 except that the aminocarboxylic acid-modified polyolefin and the hydroxy group-modified polyolefin were changed according to Table 7, whereby block polymers (X-2) to (X-5) were obtained. The results are shown in Table 7.

Example 6

A reaction vessel was charged with 20 parts of the isocyanate group-modified polyolefin (AM-2), 100 parts of the hydroxy group-modified polyolefin (BG-11), 200 parts of xylene, and 0.1 parts of bismuth tris(2-ethylhexanoate) as a urethanization catalyst. The system was purged with nitrogen and heated up to 150° C. with a nitrogen stream, so that the contents were dissolved. The contents were continuously stirred at 150° C. for three hours and xylene was evaporated under reduced pressure (1.5 kPa). The product was taken from the reaction vessel, whereby a block polymer (X-6) was obtained.

The block polymer (X-6) had a Mn of 63000, a weight ratio (A)/(B) of 16/84, and a hydroxyl value of 0.02 mgKOH/g.

Example 7

Reactions were performed as in Example 6 except that the isocyanate group-modified polyolefin and the hydroxy group-modified polyolefin were changed according to Table 7, whereby a block polymer (X-7) was obtained. The results are shown in Table 7.

Example 8

A reaction vessel was charged with 100 parts of the aminocarboxylic acid-modified polyolefin (BJ-3), 80 parts of the epoxy group-modified polyolefin (AQ-3), and 0.1 parts of diazabicycloundecene as an epoxidation catalyst. The system was purged with nitrogen and heated up to 150° C. with a nitrogen stream, so that the contents were dissolved. The contents were continuously stirred at 150° C. for three hours. The product was taken from the reaction vessel, whereby a block polymer (X-8) was obtained.

The block polymer (X-8) had a Mn of 11000, a weight ratio (A)/(B) of 46/54, and an acid value of 0.01 mgKOH/g.

Example 9

Reactions were performed as in Example 8 except that the aminocarboxylic acid-modified polyolefin and the epoxy group-modified polyolefin were changed according to Table 7, whereby a block polymer (X-9) was obtained. The results are shown in Table 7.

Example 10

A reaction vessel was charged with 100 parts of the acid-modified polyolefin (AE-15) and 130 parts of the hydroxy group-modified polyolefin (BG-16). With a nitrogen stream, the system was heated up to 180° C. and the contents were continuously stirred for 10 hours. The stirring was continued for another 10 hours under reduced pressure (1.5 kPa, the same applies hereinbelow), whereby a block polymer (X-10) was obtained.

The block polymer (X-10) had a Mn of 355000 and a weight ratio (A)/(B) of 43/57.

Example 11

Reactions were performed as in Example 10 except that the hydroxy group-modified polyolefin was changed according to Table 7, whereby a block polymer (X-11) was obtained. The results are shown in Table 7.

TABLE 7

| | | | Example 1 | Example 2 | Example 3 | Example 4 | Example 5 | Example 6 |
|---|---|---|---|---|---|---|---|---|
| | Block polymer (X) | | X-1 | X-2 | X-3 | X-4 | X-5 | X-6 |
| Materials used (parts) | Acid-modified polyolefin (AE), (BE) | AE-15 | — | — | — | — | — | — |
| | Aminocarboxylic acid-modified polyolefin (AJ), (BJ) | AJ-3 | 8 | — | — | — | — | — |
| | | AJ-4 | — | 100 | — | — | — | — |
| | | BJ-3 | — | — | 10 | — | — | — |
| | | BJ-4 | — | — | — | 100 | — | — |
| | | BJ-5 | — | — | — | — | 100 | — |
| | Isocyanate group-modified polyolefin (AM), (BM) | AM-2 | — | — | — | — | — | 20 |
| | | BM-3 | — | — | — | — | — | — |
| | Epoxy group-modified polyolefin (AQ), (BQ) | AQ-3 | — | — | — | — | — | — |
| | | BQ-3 | — | — | — | — | — | — |
| | Hydroxy group-modified polyolefin (AG), (BG) | AG-1 | — | — | 100 | — | — | — |
| | | AG-2 | — | — | — | 60 | — | — |
| | | AG-11 | — | — | — | — | 75 | — |
| | | BG-1 | 100 | — | — | — | — | — |
| | | BG-2 | — | 100 | — | — | — | — |
| | | BG-11 | — | — | — | — | — | 100 |
| | | BG-16 | — | — | — | — | — | — |
| | | BG-17 | — | — | — | — | — | — |
| | Mn of (X) | | 62,000 | 108,000 | 58,000 | 152,000 | 64,000 | 63,000 |
| | Weight ratio (A)/(B) | | 7/93 | 48/52 | 92/8 | 39/61 | 45/55 | 16/84 |

| | | | Example 7 | Example 8 | Example 9 | Example 10 | Example 11 |
|---|---|---|---|---|---|---|---|
| | Block polymer (X) | | X-7 | X-8 | X-9 | X-10 | X-11 |
| Materials used (parts) | Acid-modified polyolefin (AE), (BE) | AE-15 | — | — | — | 100 | 100 |
| | Aminocarboxylic acid-modified polyolefin (AJ), (BJ) | AJ-3 | — | — | 100 | — | — |
| | | AJ-4 | — | — | — | — | — |
| | | BJ-3 | — | 100 | — | — | — |
| | | BJ-4 | — | — | — | — | — |
| | | BJ-5 | — | — | — | — | — |
| | Isocyanate group-modified polyolefin (AM), (BM) | AM-2 | — | — | — | — | — |
| | | BM-3 | 100 | — | — | — | — |
| | Epoxy group-modified polyolefin (AQ), (BQ) | AQ-3 | — | 80 | — | — | — |
| | | BQ-3 | — | — | 97 | — | — |
| | Hydroxy group-modified polyolefin (AG), (BG) | AG-1 | — | — | — | — | — |
| | | AG-2 | — | — | — | — | — |
| | | AG-11 | 100 | — | — | — | — |
| | | BG-1 | — | — | — | — | — |
| | | BG-2 | — | — | — | — | — |
| | | BG-11 | — | — | — | — | — |

TABLE 7-continued

|  |  |  |  |  |  |
|---|---|---|---|---|---|
| BG-16 | — | — | — | 130 | — |
| BG-17 | — | — | — | — | 50 |
| Mn of (X) | 65,000 | 11,000 | 12,000 | 355,000 | 280,000 |
| Weight ratio (A)/(B) | 50/50 | 46/54 | 49/51 | 43/57 | 66/34 |

Examples 21 to 31, Comparative Examples 21 to 24

According to the blending amounts (parts) in Table 8, the block polymer (X) and the thermoplastic resin (Y) were melt-kneaded at 230° C. and 100 rpm using a twin-screw extruder (trade name: "KZW45TW", available from Technovel Corp.). Thereby, thermoplastic resin compositions (Z-1) to (Z-11) were obtained.

In Comparative Examples 21 to 24, the polyolefin (A-1) was used instead of the block polymer (X) for comparison, whereby thermoplastic resin compositions (CZ-1) to (CZ-4) were obtained.

Each of the thermoplastic resin compositions (Z-1) to (Z-11) and (CZ-1) to (CZ-4) was injection-molded using an injection molding machine (trade name: "PS40E5ASE", available from Nissei Plastic Industrial Co., Ltd.) at a nozzle temperature of 230° C. and a mold temperature of 50° C. The products were evaluated according to the following evaluation methods. The results are shown in Table 8.

<Evaluation Methods>

(1) Tensile Strength

The tensile strength was measured in conformity with JIS K7161-2:2014 and evaluated as follows.

<Evaluation Criteria> (Examples 21 to 28, Comparative Example 21)

Excellent: not lower than 30 MPa
Good: not lower than 25 MPa but lower than 30 MPa
Poor: not lower than 20 MPa but lower than 25 MPa
Bad: lower than 20 MPa <Evaluation Criteria> (Examples 29 and 30, Comparative Examples 22 and 23)

Excellent: not lower than 25 MPa
Good: not lower than 20 MPa but lower than 25 MPa Poor: not lower than 15 MPa but lower than 20 MPa
Bad: lower than 15 MPa <Evaluation Criteria> (Example 31, Comparative Example 24)

Excellent: not lower than 20 MPa
Good: not lower than 15 MPa but lower than 20 MPa
Poor: not lower than 10 MPa but lower than 15 MPa
Bad: lower than 10 MPa (2) Impact Resistance The Izod impact strength was measured in conformity with JIS K7110:1999.

<Evaluation Criteria> (Examples 21 to 28, Comparative Example 21)

Excellent: not lower than 3.0 kJ/m$^2$
Good: not lower than 1.5 kJ/m$^2$ but lower than 3.0 kJ/m$^2$
Poor: not lower than 1.0 kJ/m$^2$ but lower than 1.5 kJ/m$^2$
Bad: lower than 1.0 kJ/m$^2$ <Evaluation Criteria> (Examples 29 and 30, Comparative Examples 22 and 23)

Excellent: not lower than 10.0 kJ/m$^2$
Good: not lower than 5.0 kJ/m$^2$ but lower than 10.0 kJ/m$^2$
Poor: not lower than 1.0 kJ/m$^2$ but lower than 5.0 kJ/m$^2$
Bad: lower than 1.0 kJ/m$^2$ <Evaluation Criteria> (Example 31, Comparative Example 24)

Excellent: not lower than 2.0 kJ/m$^2$
Good: not lower than 1.5 kJ/m$^2$ but lower than 2.0 kJ/m$^2$
Poor: not lower than 1.0 kJ/m$^2$ but lower than 1.5 kJ/m$^2$
Bad: lower than 1.0 kJ/m$^2$

TABLE 8

|  |  |  | Example 21 | Example 22 | Example 23 | Example 24 | Example 25 | Example 26 | Example 27 | Example 28 |
|---|---|---|---|---|---|---|---|---|---|---|
| Thermoplastic resin composition (Z) | | | Z-1 | Z-2 | Z-3 | Z-4 | Z-5 | Z-6 | Z-7 | Z-8 |
| Blending amounts (parts) | Block polymer (X) | X-1 | 10 | — | — | — | — | — | — | — |
| | | X-2 | — | 10 | — | — | — | — | — | — |
| | | X-3 | — | — | 10 | — | — | — | — | — |
| | | X-4 | — | — | — | 10 | — | — | — | — |
| | | X-5 | — | — | — | — | 5 | — | — | — |
| | | X-6 | — | — | — | — | — | 100 | — | — |
| | | X-7 | — | — | — | — | — | — | 1 | — |
| | | X-8 | — | — | — | — | — | — | — | 10 |
| | | X-9 | — | — | — | — | — | — | — | — |
| | | X-10 | — | — | — | — | — | — | — | — |
| | | X-11 | — | — | — | — | — | — | — | — |
| | Polyolefin (A) | A-1 | — | — | — | — | — | — | — | — |
| | Thermoplastic resin (Y) | Y-1 | 100 | 100 | 100 | 100 | 100 | 100 | 100 | 100 |
| | | Y-2 | — | — | — | — | — | — | — | — |
| | | Y-3 | — | — | — | — | — | — | — | — |
| | | Y-4 | — | — | — | — | — | — | — | — |
| Evaluation results | Tensile strength | | Good | Excellent | Good | Excellent | Excellent | Good | Good | Good |
| | Izod impact strength | | Good | Excellent | Good | Excellent | Good | Excellent | Good | Good |

TABLE 8-continued

|  |  |  | Example 29 | Example 30 | Example 31 | Comparative Example 21 | Comparative Example 22 | Comparative Example 23 | Comparative Example 24 |
|---|---|---|---|---|---|---|---|---|---|
| Thermoplastic resin composition (Z) |  |  | Z-9 | Z-10 | Z-11 | CZ-1 | CZ-2 | CZ-3 | CZ-4 |
| Blending amounts (parts) | Block polymer (X) | X-1 | — | — | — | — | — | — | — |
|  |  | X-2 | — | — | — | — | — | — | — |
|  |  | X-3 | — | — | — | — | — | — | — |
|  |  | X-4 | — | — | — | — | — | — | — |
|  |  | X-5 | — | — | — | — | — | — | — |
|  |  | X-6 | — | — | — | — | — | — | — |
|  |  | X-7 | — | — | — | — | — | — | — |
|  |  | X-8 | — | — | — | — | — | — | — |
|  |  | X-9 | 10 | — | — | — | — | — | — |
|  |  | X-10 | — | 50 | — | — | — | — | — |
|  |  | X-11 | — | — | 100 | — | — | — | — |
|  | Polyolefin (A) | A-1 | — | — | — | 10 | 10 | 10 | 10 |
|  | Thermoplastic resin (Y) | Y-1 | — | — | — | 100 | — | — | — |
|  |  | Y-2 | 100 | — | — | — | 100 | — | — |
|  |  | Y-3 | — | 100 | — | — | — | 100 | — |
|  |  | Y-4 | — | — | 100 | — | — | — | 100 |
| Evaluation results | Tensile strength |  | Good | Excellent | Excellent | Poor | Poor | Bad | Poor |
|  | Izod impact strength |  | Good | Excellent | Excellent | Bad | Bad | Poor | Bad |

Note:
materials used
Y-1: propylene homopolymer, trade name "PL500A", SunAllomer
Y-2: random polypropylene, trade name "PM731M", SunAllomer
Y-3: block polypropylene, trade name "PM970A", SunAllomer
Y-4: high density polyethylene, trade name "Suntec HD J-300", Asahi Kasei Examples 41 to 51, Comparative Example 41

According to the blending amounts (parts) in Table 9, the block polymer (X) and the thermoplastic resin (YR-1) (recycled polyolefin resin, trade name "Pulverized PP", available from Miki Jushi Kogyo) were melt-kneaded at 230° C. and 100 rpm using a twin-screw extruder (trade name: "KZW45TW", available from Technovel Corp.). Thereby, thermoplastic resin compositions (Z-21) to (Z-31) were obtained.

In Comparative Example 41, the polyolefin (A-1) was used instead of the block polymer (X) for comparison, whereby a thermoplastic resin composition (CZ-21) was obtained.

Each product was further pelletized and injection-molded using an injection molding machine (trade name: "PS40E5ASE", available from Nissei Plastic Industrial Co., Ltd.) at a nozzle temperature of 230° C. and a mold temperature of 50° C. Thereby, test pieces were produced and evaluated according to the following evaluation methods. The results are shown in Table 9.

(1) Tensile Strength
The tensile strength was measured in conformity with JIS K7161-2:2014 and evaluated as follows.
<Evaluation Criteria>
Excellent: not lower than 25 MPa
Good: not lower than 20 MPa but lower than 25 MPa
Poor: not lower than 15 MPa but lower than 20 MPa
Bad: lower than 15 MPa (2) Impact Resistance
The Izod impact strength was measured in conformity with JIS K7110:1999.
<Evaluation Criteria>
Excellent: not lower than 2.5 kJ/m$^2$
Good: not lower than 1.2 kJ/m$^2$ but lower than 2.5 kJ/m$^2$
Poor: not lower than 0.8 kJ/m$^2$ but lower than 1.2 kJ/m$^2$
Bad: lower than 0.8 kJ/m$^2$

TABLE 9

|  |  |  | Example 41 | Example 42 | Example 43 | Example 44 | Example 45 | Example 46 |
|---|---|---|---|---|---|---|---|---|
| Thermoplastic resin composition (Z) |  |  | Z-21 | Z-22 | Z-23 | Z-24 | Z-25 | Z-26 |
| Blending amounts (parts) | Block polymer (X) | X-1 | 10 | — | — | — | — | — |
|  |  | X-2 | — | 10 | — | — | — | — |
|  |  | X-3 | — | — | 10 | — | — | — |
|  |  | X-4 | — | — | — | 10 | — | — |
|  |  | X-5 | — | — | — | — | 10 | — |
|  |  | X-6 | — | — | — | — | — | 1 |
|  |  | X-7 | — | — | — | — | — | — |
|  |  | X-8 | — | — | — | — | — | — |
|  |  | X-9 | — | — | — | — | — | — |
|  |  | X-10 | — | — | — | — | — | — |
|  |  | X-11 | — | — | — | — | — | — |
|  | Polyolefin (A) | A-1 | — | — | — | — | — | — |
|  | Thermoplastic resin | YR-1 | 100 | 100 | 100 | 100 | 100 | 100 |
| Evaluation results | Tensile strength |  | Good | Excellent | Good | Excellent | Excellent | Good |
|  | Izod impact strength |  | Good | Excellent | Good | Good | Excellent | Good |

TABLE 9-continued

|  |  |  | Example 47 | Example 48 | Example 49 | Example 50 | Example 51 | Comparative Example 41 |
|---|---|---|---|---|---|---|---|---|
| Thermoplastic resin composition (Z) |  |  | Z-27 | Z-28 | Z-29 | Z-30 | Z-31 | CZ-21 |
| Blending amounts (parts) | Block polymer (X) | X-1 | — | — | — | — | — | — |
|  |  | X-2 | — | — | — | — | — | — |
|  |  | X-3 | — | — | — | — | — | — |
|  |  | X-4 | — | — | — | — | — | — |
|  |  | X-5 | — | — | — | — | — | — |
|  |  | X-6 | — | — | — | — | — | — |
|  |  | X-7 | 50 | — | — | — | — | — |
|  |  | X-8 | — | 100 | — | — | — | — |
|  |  | X-9 | — | — | 10 | — | — | — |
|  |  | X-10 | — | — | — | 10 | — | — |
|  |  | X-11 | — | — | — | — | 30 | — |
|  | Polyolefin (A) | A-1 | — | — | — | — | — | 10 |
|  | Thermoplastic resin | YR-1 | 100 | 100 | 100 | 100 | 100 | 100 |
| Evaluation results | Tensile strength |  | Good | Good | Good | Excellent | Excellent | Bad |
|  | Izod impact strength |  | Good | Excellent | Good | Good | Excellent | Bad |

Note:
material used
YR-1: recycled polyolefin resin (trade name "Pulverized PP", Miki Jushi Kogyo)

Examples 61 to 71, Comparative Example 61

According to the blending amounts (parts) in Table 10, the block polymer (X), the thermoplastic resin (Y), and the filler (N1) were melt-kneaded at 230° C. and 100 rpm using a twin-screw extruder (trade name: "KZW45TW", available from Technovel Corp.). Thereby, thermoplastic resin compositions (Z-41) to (Z-51) were obtained.

In Comparative Example 61, the polyolefin (A-1) was used instead of the block polymer (X) for comparison, whereby a thermoplastic resin composition (CZ-41) was obtained.

Each product was further pelletized and injection-molded using an injection molding machine (trade name: "PS40E5ASE", available from Nissei Plastic Industrial Co., Ltd.) at a nozzle temperature of 230° C. and a mold temperature of 50° C. Thereby, test pieces were produced and evaluated according to the following evaluation methods. The results are shown in Table 10.
(1) Flexural Strength
The flexural strength was measured in conformity with JIS K7171:2016 and evaluated (unit: MPa).
(2) Impact Resistance
The Charpy impact value was measured in conformity with ASTM D6110 (unit: J/m).

TABLE 10

|  |  |  | Example 61 | Example 62 | Example 63 | Example 64 | Example 65 | Example 66 |
|---|---|---|---|---|---|---|---|---|
| Thermoplastic resin composition (Z) |  |  | Z-41 | Z-42 | Z-43 | Z-44 | Z-45 | Z-46 |
| Blending amounts (parts) | Block polymer (X) | X-1 | 10 | — | — | — | — | — |
|  |  | X-2 | — | 10 | — | — | — | — |
|  |  | X-3 | — | — | 10 | — | — | — |
|  |  | X-4 | — | — | — | 10 | — | — |
|  |  | X-5 | — | — | — | — | 2 | — |
|  |  | X-6 | — | — | — | — | — | 1 |
|  |  | X-7 | — | — | — | — | — | — |
|  |  | X-8 | — | — | — | — | — | — |
|  |  | X-9 | — | — | — | — | — | — |
|  |  | X-10 | — | — | — | — | — | — |
|  |  | X-11 | — | — | — | — | — | — |
|  | Polyolefin (A) | A-1 | — | — | — | — | — | — |
|  | Thermoplastic resin (Y) | Y-1 | 100 | 100 | 100 | 100 | 100 | 100 |
|  | Filler (N1) | N1-1 | 60 | — | — | — | 10 | 30 |
|  |  | N1-2 | — | 30 | — | — | — | — |
|  |  | N1-3 | — | — | 30 | — | — | — |
|  |  | N1-4 | — | — | — | 40 | — | — |
| Evaluation results | Flexural strength (MPa) |  | 38 | 100 | 90 | 52 | 25 | 28 |
|  | Charpy impact value (J/m) |  | 45 | 120 | 100 | 45 | 26 | 29 |

|  |  |  | Example 67 | Example 68 | Example 69 | Example 70 | Example 71 | Comparative Example 61 |
|---|---|---|---|---|---|---|---|---|
| Thermoplastic resin composition (Z) |  |  | Z-47 | Z-48 | Z-49 | Z-50 | Z-51 | CZ-41 |
| Blending amounts (parts) | Block polymer (X) | X-1 | — | — | — | — | — | — |
|  |  | X-2 | — | — | — | — | — | — |
|  |  | X-3 | — | — | — | — | — | — |
|  |  | X-4 | — | — | — | — | — | — |
|  |  | X-5 | — | — | — | — | — | — |
|  |  | X-6 | — | — | — | — | — | — |
|  |  | X-7 | 10 | — | — | — | — | — |
|  |  | X-8 | — | 50 | — | — | — | — |
|  |  | X-9 | — | — | 30 | — | — | — |

TABLE 10-continued

|  |  |  |  |  |  |  |  |
|---|---|---|---|---|---|---|---|
|  | X-10 | — | — | — | 20 | — | — |
|  | X-11 | — | — | — | — | 10 | — |
| Polyolefin (A) | A-1 | — | — | — | — | — | 10 |
| Thermoplastic resin (Y) | Y-1 | 100 | 100 | 100 | 100 | 100 | 100 |
| Filler (N1) | N1-1 | — | — | — | — | — | 10 |
|  | N1-2 | 20 | — | — | 50 | — | — |
|  | N1-3 | — | 10 | — | — | 30 | — |
|  | N1-4 | — | — | 10 | — | — | — |
| Evaluation results | Flexural strength (MPa) | 70 | 50 | 22 | 120 | 95 | 18 |
|  | Charpy impact value (J/m) | 80 | 50 | 25 | 125 | 120 | 19 |

Note:
materials used
Y-1: propylene homopolymer, trade name "PM500A", SunAllomer
N1-1: calcium carbonate, trade name "Softon 1200", Bihoku Funka Kogyo
N1-2: glass fiber, trade name "ECS03-631K", Central Glass Fiber
N1-3: carbon fiber, trade name "Torayca TV14-006", Toray
N1-4: talc, trade name "RF119", Fuji Talc The results in Tables 8 to 10 demonstrate that the block polymers (X) of the examples each provided better mechanical strength to a molded article of the thermoplastic resin composition (Z) than those of the comparative examples. Additionally, the block polymers (X) each provided excellent mechanical strength to the recycled polyolefin resin (YR).

INDUSTRIAL APPLICABILITY

The block polymer (X) of the present invention is useful as a modifier for the thermoplastic resin (Y) and can improve the mechanical strength, such as tensile strength, flexural strength, and impact strength, of the thermoplastic resin (Y). Therefore, the block polymer (X) of the present invention is significantly useful for molded articles of a variety of thermoplastic resins.

The invention claimed is:

1. A block polymer (X) comprising, as structural units, a polyolefin structure derived from a polyolefin (A) below and a polyolefin structure derived from a polyolefin (B) below,
    wherein the polyolefin (A) contains a C3-C8 α-olefin as a structural monomer with α-olefin portions having an isotacticity of 70 to 100%, has a number average molecular weight of 1000 to 200000, and has a carbon-carbon double bond number of 0.01 to 8.0 per 1000 carbon atoms,
    wherein the polyolefin (B) contains a C3-C8 α-olefin as a structural monomer with α-olefin portions having an isotacticity of 1 to 65%, and has a number average molecular weight of 1000 to 200000,
    wherein the block polymer (X) has a structure in which the polyolefin structure derived from the polyolefin (A)

and the polyolefin structure derived from the polyolefin (B) are bonded via a binder (γ) below,
    wherein the binder (γ) comprises at least one selected from the group consisting of an unsaturated (poly) carboxylic acid (anhydride) (C), a hydroxy group-containing compound (F), an epoxy group-containing compound (P), an isocyanate group-containing compound (L), a carboxyl group-containing compound (K), and an aminocarboxylic acid (H), and
    wherein the block polymer (X) has any one of the structures
    (1): $[(A)\text{-}(B)]_n$ block polymer, wherein n=1 to 5,
    (2): (A)-(B)-(A) block polymer, or
    (3): (B)-(A)-(B) block polymer.
2. The block polymer (X) according to claim 1,
    wherein the polyolefin (A) and the polyolefin (B) have a weight ratio (A)/(B) of 5/95 to 99/1.
3. The block polymer (X) according to claim 1,
    wherein the block polymer (X) has a number average molecular weight of 3000 to 500000.
4. A thermoplastic resin composition (Z) comprising:
    the block polymer (X) according to claim 1; and
    a thermoplastic resin (Y).
5. The thermoplastic resin composition (Z) according to claim 4,
    wherein the block polymer (X) and the thermoplastic resin (Y) have a weight ratio (X)/(Y) of 1/99 to 50/50.
6. The thermoplastic resin composition (Z) according to claim 4, further comprising a filler (N1),
    wherein the filler (N1) has a weight of 3 to 50 wt % based on the weight of the thermoplastic resin composition.
7. A molded article of the thermoplastic resin composition (Z) according to claim 4.

* * * * *